United States Patent [19]

Mamadzhanov et al.

[11] 4,410,052

[45] Oct. 18, 1983

[54] METHOD OF DRILLING A PRODUCTIVE BED

[76] Inventors: Ulmas D. Mamadzhanov, Ts-1, dom 19, kv. 25; Vitold M. Bakhir, proezd Gaidara, 7-a, kv. 17; Stanislav A. Alekhin; Raisa I. Born, both of Chilanzar, kvartal 24, dom 53, kv. 89, all of, Tashkent, U.S.S.R.

[21] Appl. No.: 232,033

[22] PCT Filed: May 30, 1980

[86] PCT No.: PCT/SU80/00084

§ 371 Date: Jan. 31, 1981

§ 102(e) Date: Jan. 23, 1981

[87] PCT Pub. No.: WO80/02718

PCT Pub. Date: Dec. 11, 1980

[30] Foreign Application Priority Data

May 31, 1979 [SU] U.S.S.R. ................. 2764611

[51] Int. Cl.³ .................... E21B 47/00; G01V 3/18
[52] U.S. Cl. ........................ 175/50; 175/66; 324/351
[58] Field of Search .............. 175/40, 41, 50, 66; 324/351, 353; 73/153

[56] References Cited

U.S. PATENT DOCUMENTS

| | | | |
|---|---|---|---|
| 3,182,735 | 5/1965 | Salimbeni et al. | 175/50 |
| 3,538,425 | 11/1970 | Veneziani | 324/351 |
| 3,711,765 | 1/1973 | Overton | 324/351 X |
| 3,722,606 | 3/1973 | Fertl et al. | 175/50 X |
| 3,893,522 | 7/1975 | Fertl et al. | 175/50 |

*Primary Examiner*—Stephen J. Novosad
*Attorney, Agent, or Firm*—Lilling & Greenspan

[57] ABSTRACT

The present invention relates to the completion of wells and, more particularly, it relates to a method of drilling a productive bed.

The herein disclosed method of drilling a productive bed comprises the tapping of the bed roof using a starting flushing fluid and the determination of the redox potential value at the moment of tapping the bed roof, and subsequent replacement of the starting flushing fluid with a fluid having redox potential value and sign equal to those of the productive bed rock.

4 Claims, 1 Drawing Figure

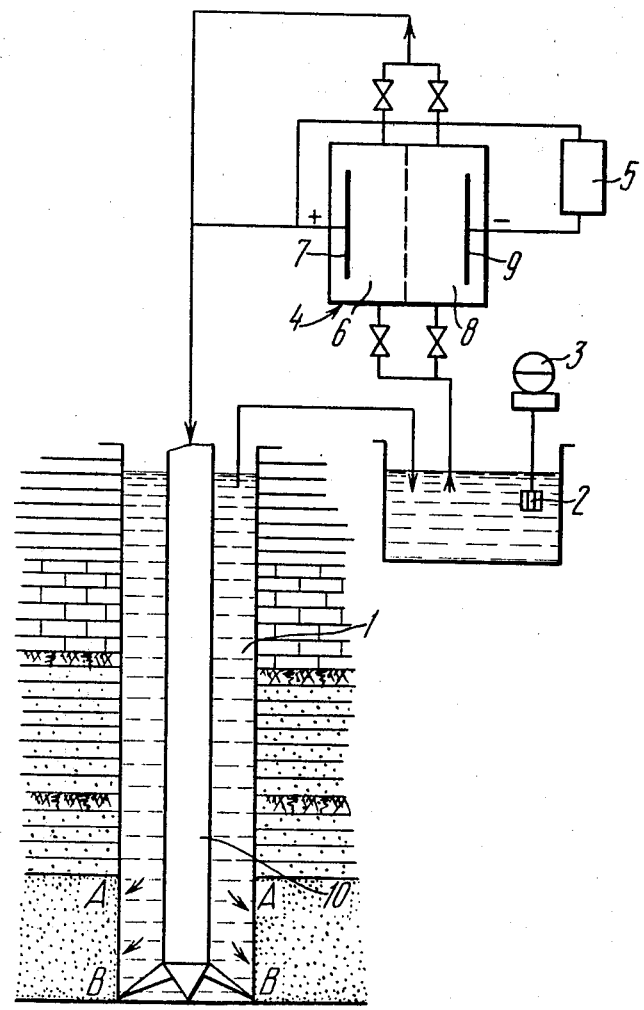

METHOD OF DRILLING A PRODUCTIVE BED

FIELD OF THE INVENTION

The present invention relates to the completion of wells and, more particularly, it relates to a method of drilling a productive bed.

BACKGROUND OF THE INVENTION

The completion of wells involves a wide range of technological operations including the tapping of productive beds, formation testing in an open shaft, well lining and cementing, as well as the tapping of beds by perforation with subsequent outfitting of the well with undeground and ground equipment and bringing in of the well. The well productivity and duration of its exploitation depend upon the quality of execution of the afore-listed technological operations.

The principal objective in the completion of well is maintaining the natural filtration characteristic of the reservoir bed. A deterioration of the reservoir properties of the bed is caused by the penetration of filtrate and the solid phase of flushing fluid into the well face zone, which leads to the various irreversible processes in the bed. In so doing, there taken place the blocking of interstitial space with water-oil emulsion, the clogging of pore canals with the solid phase of flushing fluid, the plugging of interstitial space with swelling clay and products of chemical interaction of the flushing fluid filtrate with reservoir fluids and rock, reduction of the pore size due to rock deformation upon tapping, etc.

At present, the work related to the completion of wells is directed mainly towards:

setting up conditions for efficient execution of operations while tapping a bed for maintaining reservoir properties of the latter; and intensifying the influx of fluid to a well by chemical, thermochemical, hydraulic and other means.

Investigations have shown that there are up to 3,000 outlet openings of pore canals per square inch of common sandstone (cf., Maly George P. Minimizing Formation Damage. Proper Fluid Selection Helps Avoid Damage, Oil and Gas J., 1976, 22/III, No. 74, No. 12, pp. 68–70). Said openings differ in shape and size and are readily contaminated with solid particles of inorganic and organic substances, and with polymers. Even if the majority of such canal openings in the shaft zone of the bed are contaminated, the well is still of some commercial value; however, its rating is extremely low and the flow rate decreases rapidly.

If the shaft zone of the bed is contaminated through a considerable depth, the initial permeability of clogged rock cannot be restored. However, in the case of contamination of but a part of the shaft zone of the bed (natural filter), the rock permeability is restored following an appropriate treatment of the well face zone.

Four main types of bed contamination are distinguished, namely:

1. The clogging of pore canals in the rock with solid particles penetrating the bed from the flushing fluid upon drilling, perforation and maintenance work in the well.

2. The contamination of the bed due to a reaction between clays contained in the bed with fresh water penetrating the bed serves a reason for the swelling or dispersion of the clays.

3. The contamination of the bed associated with an increased water saturation of rocks near the well shaft, due to fluid filtration into the bed upon drilling.

4. The formation of pockets in the bed and evacuation of loose rock from the well.

It has been found that one of the reasons for reservoir contamination is the formation of a zone of increased water saturation in the reservoir, the penetration of the interstitial space of the bed by clay particles from flushing fluid, the clogging by said particles of pore canals and hydration of clays, which results in the swelling or dispersion of particles in pore canals, injection of contaminated water into the bed and evacuation of sand upon destruction of poorly cemented rocks (cf., Izucheniye haraktera zagriazneniya plasta s pomoschiyu kernov i kernovyh analizov—Studying the Nature of Bed Contamination with the Aid of Cores and Core Analyses. Express Information, series on Petroleum and Gas Mining, No. 41, VINITI, Moscow, 1977).

In order to preclude the formation of a zone of increased water saturation in the shaft portion of the bed or to reduce the size of such zone, while tapping the bed use is made of inert flushing fluids, oil-based solutions, compressed gas, water. However, the substitution of, for example, water for flushing fluid in the course of bringing in of wells accomplishes nothing, inasmuch as the bed has already been clogged and no additional hydrodynamic or thermochemical effect will restore its initial rating, since productive reservoirs are made up mainly of hydrophilic materials and, upon interaction with clay particles activated with adsorptive-active reagents, exhibit stable assimilation in the pores (clogging).

DESCRIPTION OF THE PRIOR ART

There are also known methods of drilling productive beds, comprising the tapping of the bed roof using flushing fluid, with subsequent replacement of the latter with a flushing fluid featuring altered physical-chemical properties (cf., K. Ghetlin, Bureniye i zakanchivaniye skvazhin—Drilling and Completion of Wells, Gostoptehizdat, Moscow, 1963, pp. 362–363).

Said prior art methods are characterized, depending on the rock being penetrated, by varying the properties of flushing fluid, reducing filtration, replacing the clay solution with water, oil or some other solution compatible with the given rock. However, all of said prior art methods fail to preclude reduction-oxidation reactions between the flushing fluid and bed rock which, in turn, leads to the clogging (colmatage) of the bed. In addition, the replacement of basic flushing fluid used in the drilling of common beds with a special flushing fluid of altered physical-chemical characteristics requires for additional expenses caused by the preparation of the latter fluid and by the execution of technological steps associated with the replacement of flushing fluid.

SUMMARY OF THE INVENTION

The present invention is aimed at solving the problem of developing a method of drilling a productive bed, by replacing the flushing fluid with a fluid of altered physical-chemical properties that would provide, owing to said variation of flushing fluid properties, for a considerable reduction of the degree of colmatage of the productive bed and for the preservation of its natural permeability, thereby increasing the rating of the bed while simultaneously reducing the consumption of labor and materials.

The problem of the invention is solved by the use of a method of drilling a productive bed, comprising tapping of the bed roof using a starting flushing fluid, and subsequent replacement of the latter with a flushing fluid of altered physical-chemical properties. According to the present invention, the value of redox potential of the bed-forming rock is determined at the moment of tapping the bed roof and the flushing fluid of altered physical-chemical properties is a fluid having a redox potential value and sign equal to those of the productive bed rock.

The tapping of a bed using a fluid featuring physical-chemical properties close to those of the rocks making up the protective bed, i.e., the properties which rule out mutual aggression of rock and flushing fluid, in particular, the equality of redox potentials eliminates ion-exchange processes between the minerals making up the rock and flushing fluid, which results in a sharp reduction of the flushing fluid filtrate penetration into the bed and of the colmatage power of the flushing fluid, as well as in the preservation of natural permeability of the productive bed.

It is expedient that the value and sign of the redox potential of the productive bed rock at the moment of tapping said bed be determined from their deviation from the value and sign of the redox potential of the starting flushing fluid.

This helps improve the information on the productive bed, accelerate the process of determining the redox potential of the productive bed rock and reduce the expenses by eliminating additional steps required for the analysis of slurry of rocks being drilled.

It is preferable that the variation of the value and sign of the redox potential of the flushing fluid be effected by treating the flushing fluid in one of the electrode zones of a diaphragm cell. This provides a possibility of varying the physical-chemical properties of the flushing fluid in a wide range while maintaining its basic working parameters and quality, with a simultaneous reduction of chemical reagent consumption by fully eliminating the need to use such reagents.

It is desirable that the variation of the value and sign of the redox potential of the flushing fluid be effected in the range of from $-1.6$ V to $+1.8$ V, depending on the mineral composition of the productive bed rocks. This provides a possibility of carrying out the process of drilling the productive bed made up of rocks of diverse mineral composition without the need for the colmatage of said rocks.

DETAILED DESCRIPTION OF THE INVENTION

As is known, all reservoirs making up productive beds feature a diffusion-adsorption activity. Said activity consists essentially in that, when solutions of different concentrations are separated from each other by a porous partition, there occurs the diffusion of ions from a more concentrated solution to a less concentrated one.

The diffusion phenomenon is due to reduction-oxidation reactions occurring in complex heterogeneous systems such as fluid-saturated productive beds and the flushing fluid coming in contact with the bed and fluids thereof in the course of tapping the beds.

When tapping a productive bed, the flushing fluid affected by pressure higher than the reservoir pressure penetrates the pores of the well face zone to leave clay particles in said pores. In the zone of flushing fluid contact with the rock being drilled, ion-exchange processes occur leadng to reduction-oxidation reactions. The redox potential serves the measure of intensity of the reduction-oxidation processes. The value of redox potential depends on the ratio of concentrations of the oxidation and reduction forms of ions making up the system under consideration.

Under stationary, i.e., very slowly varying in time, conditions of energy exchange with neutral environment, the redox potential of flushing fluid usually takes an equilibrium value corresponding to the ratio of oxidizer activity to reducer activity equal to 0.5. An important index of the system chemical activity such as pH also takes under these conditions a neutral value equal to 7.

Any deviation of said two characteristics from the equilibrium position means that the system is energetically unstable and that reduction-oxidation reactions may occur in said system both upon contact with the environment (rock of the well walls, fluids supplied to the solution in the course of drilling) and upon contact between particles and phases of the system proper.

As a result of difference between the redox potential values of the flushing fluid and rock, the flushing fluid filtrate is supplied to the bed, clogs the interstitial space of the reservoir (rock) and intensifies reduction-oxidation reactions between the flushing fluid filtrate and the system of filtrate-saturated bed.

For precluding the afore-described phenomena, in particular, for neutralizing the reduction-oxidation reactions between the flushing fluid and productive bed rock, use can be made of the herein disclosed invention. At the moment of tapping the productive bed, the value and sign of the redox potential of the rocks making up the productive bed are determined. To this end, the redox potentials are measured of the flushing fluid entering the well and of the flushing fluid leaving said well, which redox potentials will have different values because of chemical reactions occurring in the zone of contact of the flushing fluid with the productive bed rock. Then, the value of the redox potential of the productive bed rock is found, for example, from the difference between the values of redox potential of the incoming and outgoing fluid. Said difference between the redox potential values of the incoming and outgoing fluids provides information on the lithological composition of the rock being drilled. Using special monographic charts, the resulting difference is related to some or the other rock composition. Given the rock composition, one can find from the tables the normal redox potential of the rock being drilled.

The redox potential is measured by conventional means, for example, with the aid of a calomel electrode by Kryuikov (cf., A. I. Boldyrev, Fizicheskaiya i kolloidnaya himiya—Physical and Colloid Chemistry, Vyschaiya Shkola Publishers, Moscow, 1974, p. 319).

Thereupon, the starting flushing fluid circulating in the well is replaced with another flushing fluid whose physical-chemical properties differ from those of the starting fluid; but which, however, resemble closely the physical-chemical properties of the productive bed rock. In other words, a fluid is injected into the well having a redox potential equal in sign and value to that of the productive bed rock. The equality of redox potential values and the uniformity of their signs (positive or negative) preclude the occurrence of reduction-oxidation reactions between the bed rock and flushing fluid which, in turn, serves to reduce the intensity of diffusion-adsorption over-flows of the flushing fluid filtrate to the bed and of the reservoir fluids to the flushing fluid.

Used as the flushing fluid having a redox potential equal to that of the rock is the same flushing fluid which was used throughout the well drilling process, the only exception being that, prior to tapping the productive bed, said fluid is pre-treated in the zone of one of the electrodes of the diaphragm cell until reaching a redox potential equal in sign and value to that of the productive bed rock.

The redox potential of the flushing fluid can be varied by adding various chemical reagents thereto; however, this results in an increased cost of the drilling process.

The flushing fluid is pre-treated in the diaphragm cell until reaching a redox potential value in the range of from $-1.6$ to $+1.8$ V. This range of the redox potential values covers the entire gamut of rocks making up productive beds.

Presented hereinbelow is a detailed description of the preferred embodiment of the method of the invention, with references to the accompanying drawing which illustrates diagrammatically the process of drilling a productive bed.

At the moment of tapping a productive bed A-B or, rather, the roof thereof at point A, the redox potential is measured of a flushing fluid entering a well 1 and of that leaving said well. Depending on the composition of rocks making up the productive bed, the redox potential of the flushing fluid will exhibit an increase or decrease. The redox potential is measured by means of a pickup 2 with a recorder 3. A calomel electrode is used as the pickup 2. First, the difference is found between the redox potential values of the incoming and outgoing flushing fluids. Based on preliminary nomographic charts, there is determined the lithological composition of the rock to which the obtained difference of redox potential values corresponds. Then, the normal redox potential value corresponding to the given rock composition is found from the tables. In this manner, the sign and value of the redox potential of the productive bed rock is found. After that, the flushing fluid leaving the well is directed to a diaphragm cell 4 provided with a d.c. source 5, where it is subjected to electric treatment.

If the redox potential of the rock of the productive bed being drilled has a positive sign, the flushing fluid is treated in a zone 6 of a positive electrode 7. In case the redox potential of the rock has a negative value, the flushing fluid is treated in a zone 8 of a negative electrode 9. The flushing fluid is subjected to electric treatment until its redox potential reaches the same value and sign as those of the redox potential of the productive bed rock.

The variations in the value of the redox potential over the productive bed thickness are assumed to be close to average for the given type of rock in the range of from $-1.6$ V to $+1.8$ V. For example, the fluctuations of the redox potential caused by the difference in the properties and chemical composition of like rocks saturated with a fluid of one type may range (in terms of power) from several (often) to tens of (seldom) millivolts. The fluctuations of the redox potential caused by transition from rocks of one type to rocks of another type having a different chemical composition range from tens to hundreds of millivolts, depending on the extent of their difference. In addition, said values provide the limits of reversible electrochemical reactions. A deviation of the redox potential value to either side by more than 0.2–0.5 V may lead to irreversible chemical reactions within the flushing fluid itself, which may cause the deterioration of the latter. Therefore, the treatment of the flushing fluid in the electrolyzer should be carried out within the afore-specified limits of the redox potential value.

The thus treated flushing fluid is injected in the well 1 while continuing the tapping of the productive bed A-B by a drilling tool 10. Inasmuch as the flushing fluid is chemically passive with respect to the bed rock, there occur no diffusion-adsorption overflows therebetween, the bed is not clogged and its rocks retain their natural permeability.

The present invention will help increase the bed rating by at least 40–50% owing to reduced colmatage and retained natural permeability, as well as reduce material and technical costs due to the possibility of using the same flushing fluid with an altered redox potential and of eliminating the need to use costly chemical reagents for treating the flushing fluid. Presented hereinbelow is a specific example illustrating the execution of the method according to the present invention.

EXAMPLE 3,735 Meters were drilled in the course of well drilling. Prior to tapping the productive bed roof located at the 3,740-m level (the cover thickness of the productive bed roof was found from the geological column based on exploration data), measurements were begun of the redox potential values of the starting flushing fluid delivered to the well and discharged therefrom. Down to the level of 3,500 m, the well was cased; below the casing string, the rocks made up of quartzy sandstone were drilled. The redox potential value of the incoming flushing fluid was $-400$ mV and the outgoing fluid $--380$ mV. At the moment of tapping the productive bed roof, the redox potential value of the outgoing fluid varied sharply up to $-300$ mV. The circulation was discontinued for a period of 15 minutes, after which it was resumed. At the well outlet, the redox potential value of the batch of flushing fluid in contact with the tapped productive bed for 15 minutes was $-200$ mV. According to the data obtained from earlier experiments, such a deviation of the redox potential value is characteristic of a sandy reservoir bed saturated with highly viscous oil having a high content of taryy substances. According to a scale of values of own normal redox potentials of rocks (cf., A. I. Boldyrev, Fizicheskaiya i kolloidnaiya himiya—Physical and Colloid Chemistry, Vyschaiya Shkola Publishers, Moscow, 1974), the redox potential of an oilsaturated sand bed is $+200$ mV.

Thereafter, the starting flushing fluid was supplied to the zone of the positive electrode of a diaphragm cell wherein its redox potential value was brought to $+200$ mV as a result of unipolar treatment, thereby changing the physical-chemical properties of said fluid. Further circulation of the flushing fluid, as the productive horizon was drilled on, was effected using the flushing fluid having the redox potential value of $+200$ mV. Following the completion of the productive bed, the well was flushed with the same fluid. Inasmuch as the flushing was effected under conditions of some counter-pressure on the bed, part of said fluid entered the face zone of the bed, however, no physical-chemical ion-exchange reactions occurred between the flushing fluid, bed rock and reservoir fluids, since all these were chemically neutral with respect to each other. After that, the cementation of the extracting column was effected. Upon the injection of cement into the annulus, the plugging grout did not clog the face zone of the productive bed since the latter zone contained a flushing fluid with altered physical-chemical parameters, said fluid serving to preclude the grout penetration into the bed.

The natural permeability of oil sandstone was found from a core sample to be 240 md. After injecting in the well the flushing fluid of altered redox potential, according to the invention, the rock permeability was 230 md. When tapping productive beds by conventional methods, the permeability decreased to 160 md due to the colmatage of the face zone. After the casing perforation in the productive bed zone and generation of the influx of oil by generating depression on the bed, the well rating agreed with theoretical data calculated from natural permeability and amounted to 450 m$^3$ per day while the rating of an analogous well drilled by conventional methods amounted to 270 m$^3$ per day. Thus, the method of the present invention provides for a 40% increase of the well rating as compared with prior art methods.

Industrial Applicability

The herein disclosed method can find extensive application in petroleum and gas mining and in geological exploration.

We claim:

1. A method of drilling a productive bed in a well, comprising the tapping of the bed roof and the use of a starting flushing fluid, and determining the redox potential value of the productive bed rock, wherein the improvement comprises altering the physical-chemical properties of the starting flushing fluid leaving the well until they correspond to the physical-chemical properties of the productive bed rock; altering the sign and value of the redox potential of the starting flushing fluid leaving the well until they correspond to the sign and value of the redox potential of the productive bed rock; and introducing the changed starting flushing fluid back into the well.

2. A method as claimed in claim 1, wherein the value and sign of the redox potential of the productive bed rock are determined at the moment of tapping said bed, from the deviation of the value and sign of the redox potential of the starting flushing fluid at an inlet and an outlet of the well.

3. A method as claimed in claims 1 or 2, wherein the value and sign of the redox potential and the physical-chemical properties of the starting flushing fluid are altered by treating the starting flushing fluid in one of the electrode zones of a diaphragm cell.

4. A method as claimed in claim 3, wherein the value and sign of the redox potential of the starting flushing fluid are varied from $-1.6$ to $+1.8$ V, depending on the lithological composition of the productive bed.

* * * * *